United States Patent
Mayrides et al.

(10) Patent No.: US 9,452,831 B2
(45) Date of Patent: Sep. 27, 2016

(54) INTEGRATION OF ROTARY ELECTRICAL ACTUATOR FOR SWASHPLATELESS INDIVIDUAL BLADE CONTROL

(71) Applicant: Sikorsky Aircraft Corporation, Stratford, CT (US)

(72) Inventors: Bryan D. Mayrides, Derby, CT (US); William A. Welsh, North Haven, CT (US); Michael Joseph DeVita, Riverside, CT (US); Timothy Fred Lauder, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 744 days.

(21) Appl. No.: 13/867,395

(22) Filed: Apr. 22, 2013

(65) Prior Publication Data

US 2014/0314573 A1    Oct. 23, 2014

(51) Int. Cl.
*B63H 3/00*    (2006.01)
*B64C 27/72*   (2006.01)

(52) U.S. Cl.
CPC ....... *B64C 27/72* (2013.01); *B64C 2027/7216* (2013.01); *Y02T 50/34* (2013.01)

(58) Field of Classification Search
CPC ..... B64C 27/72; B64C 27/615; B64C 27/78; B64C 2027/7216; B64C 2027/7205; B64C 2027/004; B64C 2027/7266
See application file for complete search history.

(56) References Cited

U.S. PATENT DOCUMENTS

| | | | |
|---|---|---|---|
| 5,626,312 A | 5/1997 | Head | |
| 6,530,542 B2 | 3/2003 | Toulmay | |
| 7,424,988 B2 | 9/2008 | McDonnell | |
| 7,674,091 B2 | 3/2010 | Zierten | |
| 7,699,584 B2 | 4/2010 | Mollhagen | |
| 7,762,770 B2 | 7/2010 | Sun et al. | |
| 8,197,205 B2* | 6/2012 | Rudley | B64C 27/72 416/1 |
| 8,235,324 B1* | 8/2012 | Birch | B64C 27/68 244/17.25 |
| 2010/0129214 A1 | 5/2010 | Wilson et al. | |
| 2010/0150719 A1 | 6/2010 | Waide et al. | |

FOREIGN PATENT DOCUMENTS

| | | |
|---|---|---|
| EP | 1985536 A2 | 10/2008 |
| JP | H0911994 A | 1/1997 |
| WO | 2005100154 A1 | 10/2005 |
| WO | 2012076705 A2 | 6/2012 |

OTHER PUBLICATIONS

European Search Report for application EP 14165212.3, mailed Sep. 2, 2014, 8 pages.

* cited by examiner

*Primary Examiner* — Craig Kim
*Assistant Examiner* — Jason Fountain
(74) *Attorney, Agent, or Firm* — Cantor Colburn LLP (57) ABSTRACT

An individual blade control system (IBCS) for a rotor system having a rotor hub is provided including a plurality of blade cuffs mounted to the rotor hub. Each blade cuff is configured to receive a rotor blade and rotate about a blade axis. A plurality of electrical actuators is mounted to the rotor hub adjacent at least one of the plurality of blade cuffs. Each electrical actuator is configured to rotate about an actuator axis. The plurality of blade axes and the plurality of actuator axes are arranged in a plane. Each electrical actuator is coupled to an adjacent blade cuff such that rotation of one of the plurality of electrical actuators causes a proportional rotation of one of the blade cuffs.

22 Claims, 10 Drawing Sheets

INTEGRATION OF ROTARY ELECTRICAL ACTUATOR FOR SWASHPLATELESS INDIVIDUAL BLADE CONTROL

BACKGROUND OF THE INVENTION

Exemplary embodiments of the invention generally relate to rotary wing aircrafts, and more particularly, to a control system for pitching the blades of a rotor of a rotary wing aircraft.

Control of a rotary wing aircraft is affected by varying the pitch of the rotor blades individually as the rotor rotates and by varying the pitch of all of the blades together. These are known respectively as cyclic and collective pitch control. Blade pitch control of a rotary wing aircraft main rotor is commonly achieved through a swashplate.

The swashplate is typically concentrically mounted about the rotor shaft. The swashplate generally includes two rings connected by a series of bearings with one ring connected to the airframe (stationary swashplate) and the other ring connected to the rotor hub (rotating swashplate). The rotating ring is connected to the rotor hub through a pivoted link device typically referred to as "scissors", with the static ring similarly connected to the airframe. The rotating swashplate rotates relative the stationary swashplate. Apart from rotary motion, the stationary and rotating swashplate otherwise move as a unitary component. Cyclic control is achieved by tilting the swashplate relative to a rotor shaft and collective control is achieved by translating the swashplate along the rotor shaft.

Pitch control rods mounted between the main rotor blades and the rotating swashplate mechanically link the rotating swashplate to each individual main rotor blade. Main rotor servos extend between and attach to the stationary swashplate and the airframe. Displacement of the main rotor servos results in displacement of the stationary swashplate. Displacement of the stationary swashplate results in displacement of the rotating swashplate. Displacement of the rotating swashplate results in displacement of pitch control rods and therefore each individual main rotor blade. Hence, by actuating selected main rotor servos, collective and cyclic commands are transferred to the rotor head as vertical and/or tilting displacement of the swashplates resulting in pitch control of the main rotor blades.

The swashplate and its associated linkages require a considerable amount of space, add to the aerodynamic drag of the aircraft, and account for a significant amount of gross weight. Due to their complexity and flight critical nature, the swashplate systems require regular and costly maintenance and inspection. Additionally, control inputs from swashplates are limited to collective and cyclic, which limit the resulting blade motion to steady and once per revolution rotation. Blade motions at higher harmonic frequencies have shown potential aircraft benefits such as improved performance and vibration. Thus, there is a continuing effort to improve blade pitch control for rotor systems of a rotary wing aircraft.

BRIEF DESCRIPTION OF THE INVENTION

According to one embodiment of the invention, an individual blade control system (IBCS) for a rotor system having a rotor hub is provided including a plurality of blade cuffs mounted to the rotor hub. Each blade cuff is configured to receive a rotor blade and rotate about a blade axis. A plurality of electrical actuators is mounted to the rotor hub adjacent at least one of the plurality of blade cuffs. Each electrical actuator is configured to rotate about an actuator axis. The plurality of blade axes and the plurality of actuator axes are arranged in a plane. Each electrical actuator is coupled to an adjacent blade cuff such that rotation of one of the plurality of electrical actuators causes a proportional rotation of one of the blade cuffs.

According to another embodiment of the invention, a rotary wing aircraft is provided including a rotor system having at least one rotatable rotor hub. A plurality of blade cuffs are mounted to the at least one rotor hub. Each blade cuff is configured to receive a rotor blade and rotate about a blade axis. A plurality of electrical actuators is mounted to the at least one rotor hub adjacent at least one of the plurality of blade cuffs. Each electrical actuator is configured to rotate about an actuator axis. The plurality of blade axes and the plurality of actuator axes are arranged in a plane. Each electrical actuator is coupled to an adjacent blade cuff such that rotation of one of the plurality of electrical actuators causes a similar rotation of one of the blade cuffs.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
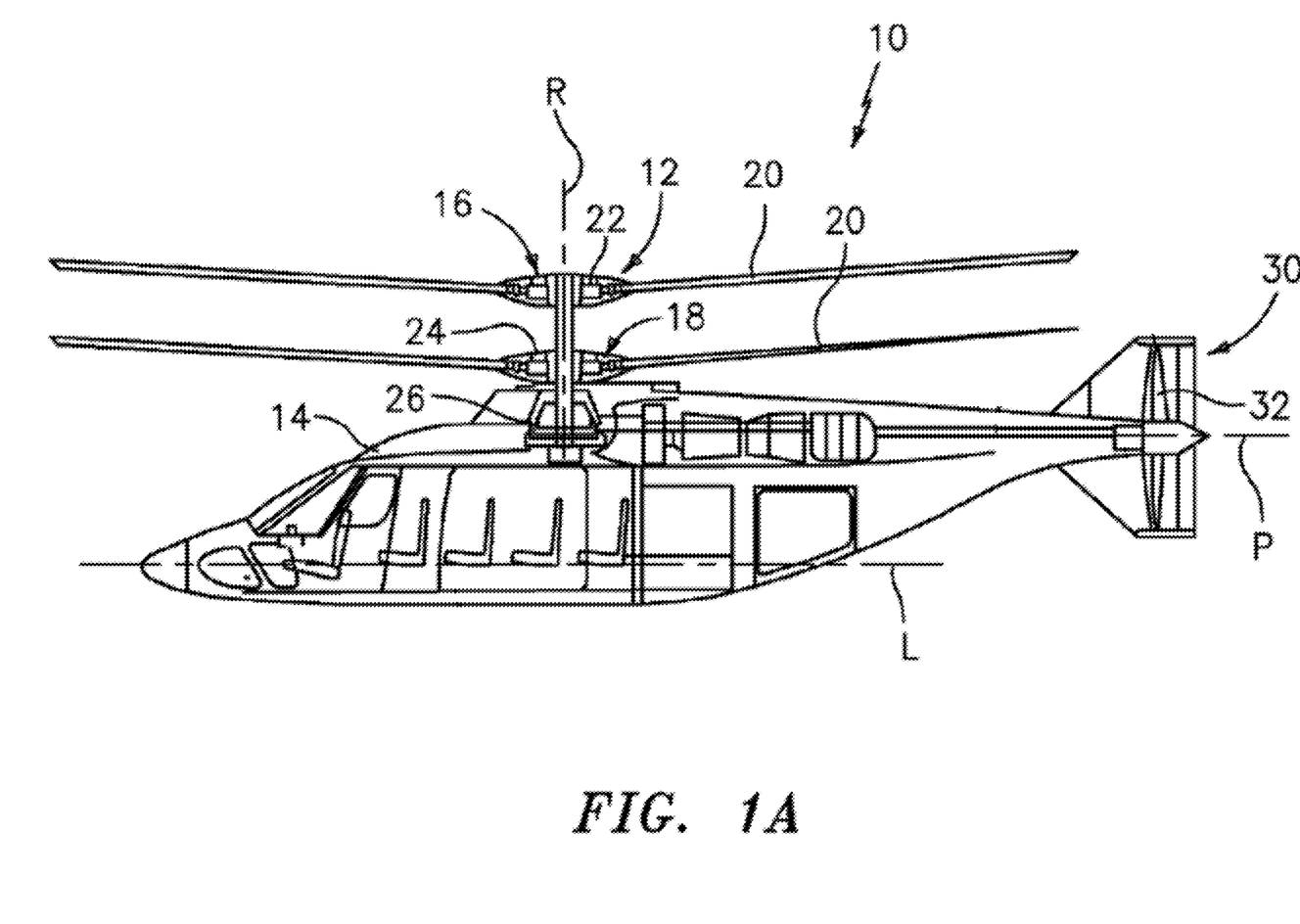
FIGS. 1A and 1B are general side and top views of an exemplary rotary wing aircraft for use with the present invention.
Figure 1B:
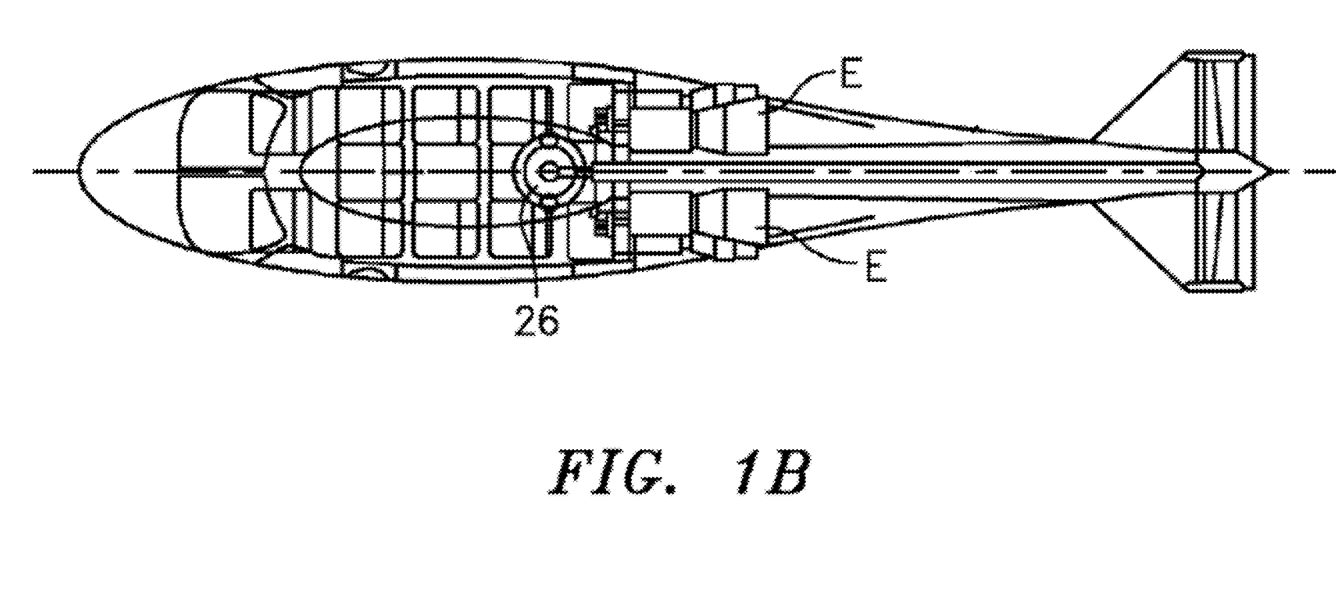

FIGS. 1A and 1B illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft includes an airframe 14 which supports the dual, contra-rotating, coaxial main rotor system 12 as well as a translational thrust system 30 which provides translational thrust generally parallel to an aircraft longitudinal axis L.

The main rotor system 12 includes a first rotor system 16 and a second rotor system 18. Each rotor system 16, 18 includes a plurality of rotor blades 20 mounted to a respective rotor hub 22, 24. The main rotor system 12 is driven by a main gearbox 26. The translational thrust system 30 may be any propeller system including, but not limited to a pusher propeller, a tractor propeller, a nacelle mounted propeller etc. The illustrated translational thrust system 30 includes a pusher propeller system 32 with a propeller rotational axis P oriented substantially horizontal and parallel to the aircraft longitudinal axis L to provide thrust for high speed flight. The translational thrust system 30 may be driven through the main gearbox 26 which also drives the rotor system 12.

The main gearbox 26 is driven by one or more engines, illustrated schematically at E. In the case of a rotary wing aircraft, the gearbox 26 may be interposed between one or more gas turbine engines E, the main rotor system 12 and the translational thrust system 30. Although a particular rotary wing aircraft configuration is illustrated and described in the disclosed non-limiting embodiment, other configurations and/or machines with rotor systems are within the scope of the present invention.

Referring now to FIGS. 2-7, an independent blade control system (IBCS) 50 configured for use with a rotor system, such as first rotor system 16 or second rotor system 18 for example, is illustrated. In applications having multiple rotor systems, such as the rotary wing aircraft 10 illustrated in FIGS. 1A and 1B, a separate IBCS 50 may be applied to each of the plurality of rotor systems. An IBCS 50 includes multiple blade cuffs 52 mounted to a rotor hub, for example hub 22 or 24. Each blade cuff 52 is configured to receive and support a rotor blade 20. In one embodiment, the blade cuffs 52 are mounted diametrically opposite one another and are evenly spaced about the circumference of the rotor hub 22. Each of the blade cuffs 52 is configured to rotate about an axis B to adjust the pitch of the blade 20 coupled thereto.

Multiple electrical actuators 56 are similarly mounted to the rotor hub 22, and each electrical actuator 56 is located generally adjacent at least one of the plurality of blade cuffs 52. To control the movement of each rotor blade 20 independently, the system 50 includes a separate electrical actuator 56 for each of the plurality of blade cuffs 52. Each of the plurality of electrical actuators 56 is similarly configured to rotate about an axis A. In the illustrated non-limiting embodiments, the plurality of electrical actuators 56 is generally arranged within the same plane as the plurality of blade cuffs 52, rotating about axis R.

Figure 2:
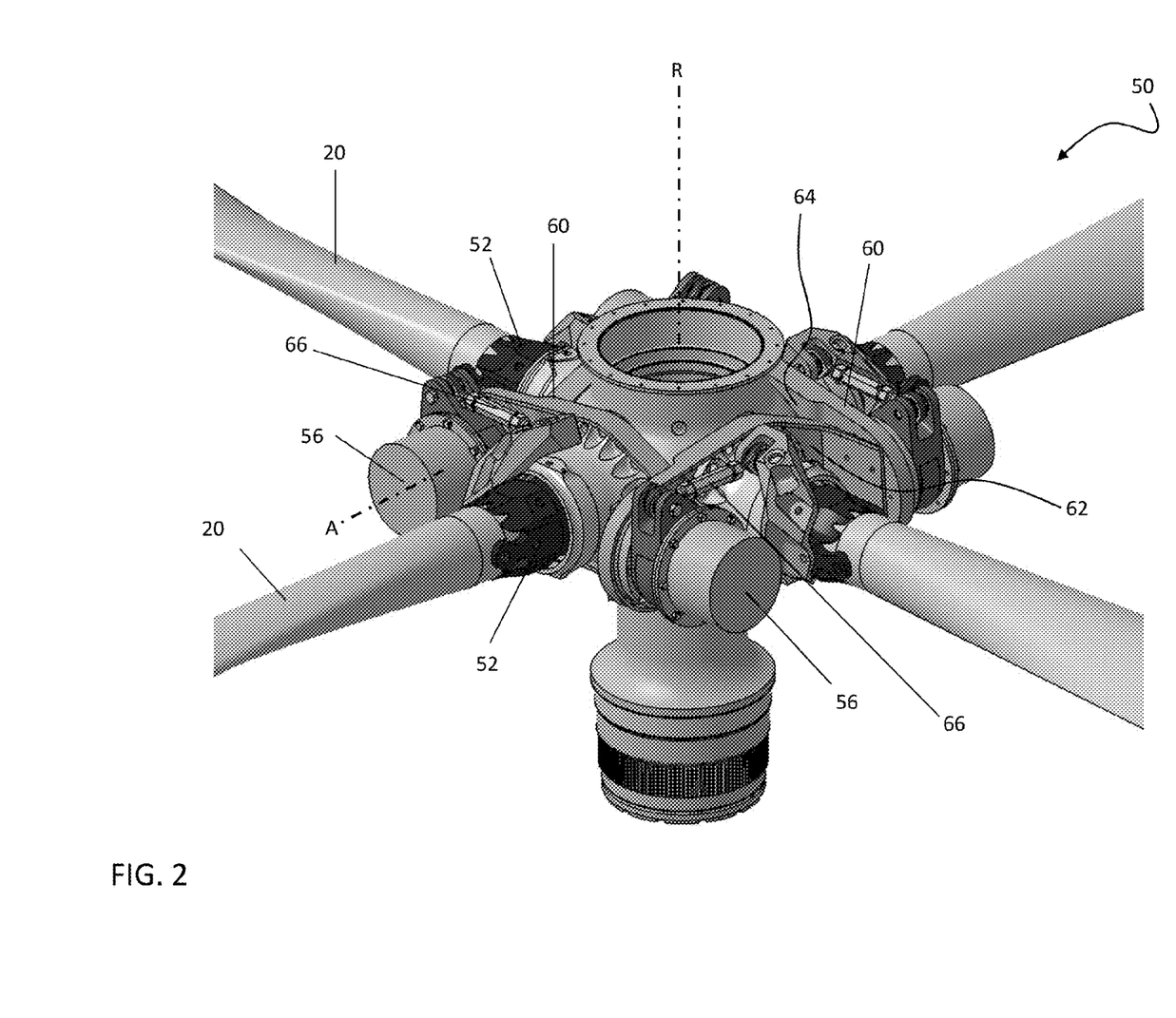
FIG. 2 is a perspective view of an individual blade control system (IBCS) according to the present invention.
Figure 3:
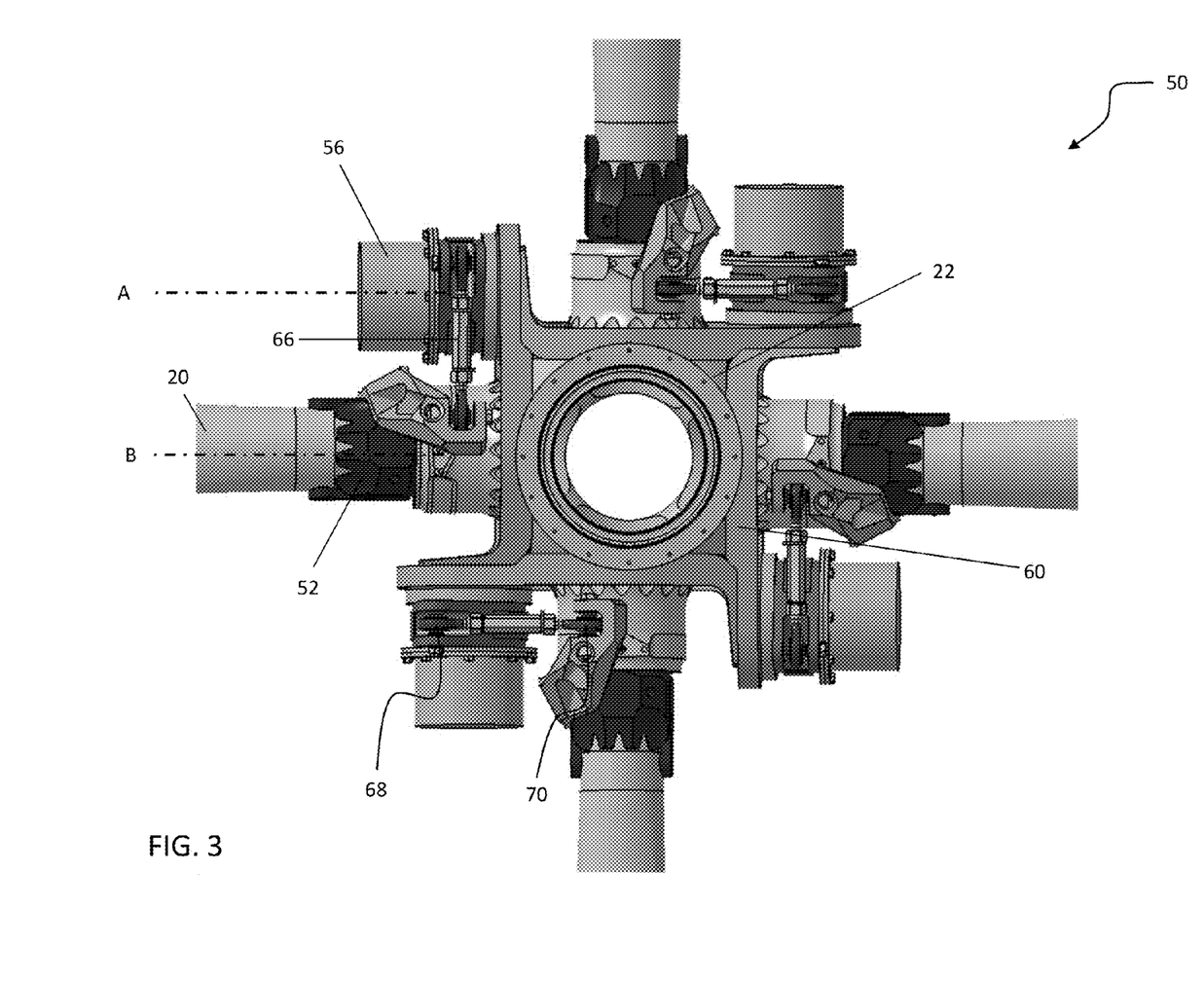
FIG. 3 is a top view of an IBCS according to an embodiment of the present invention.
Figure 4:
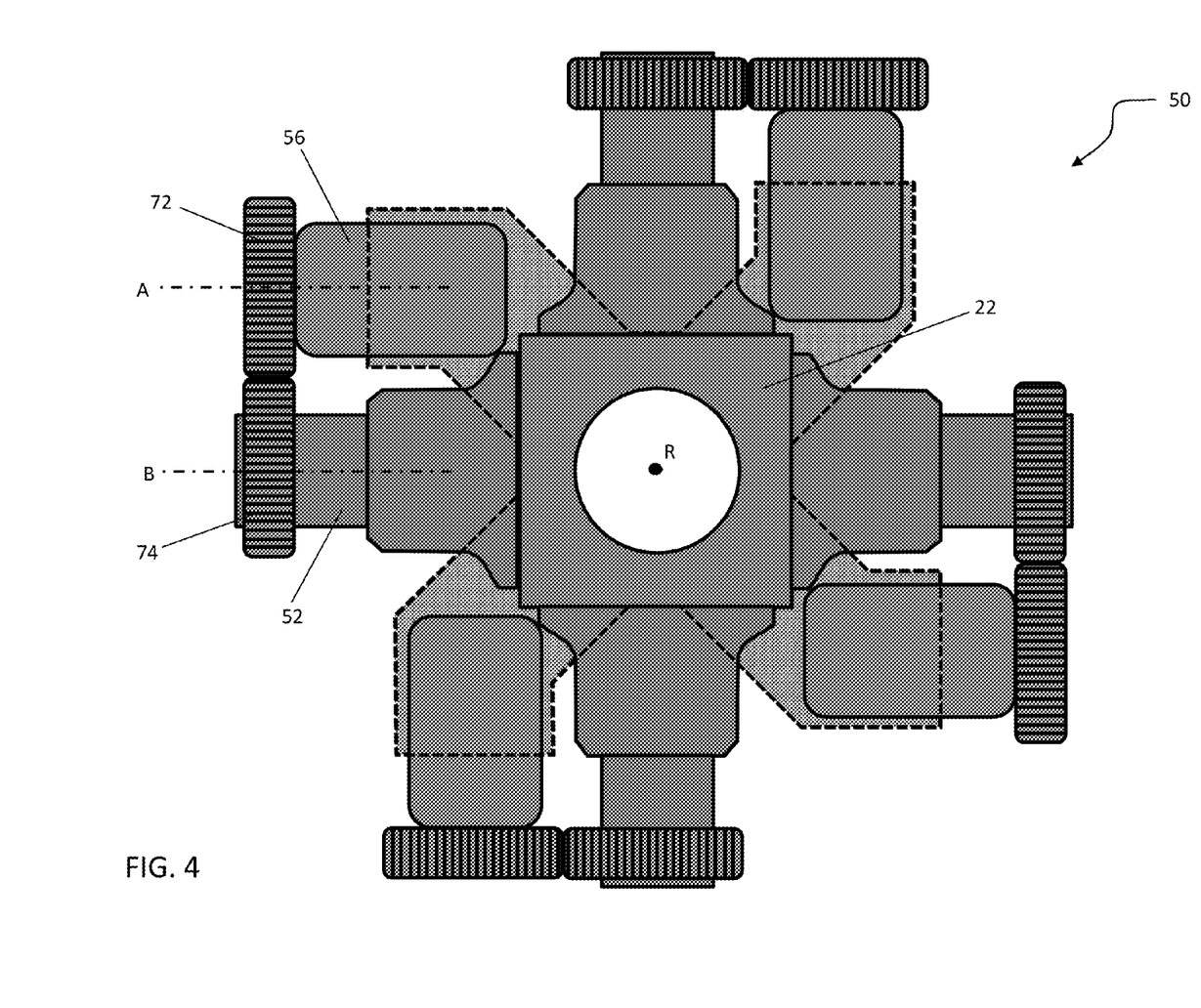
FIG. 4 is a top view of an IBCS according to another embodiment of the present invention.

In one non-limiting embodiment, illustrated in FIGS. 2-4, the electrical actuators 56 are arranged such that the axis of rotation A of each of the actuators 56 is parallel to the axis of rotation B of an adjacent blade cuff 52. The IBCS 50 may include at least one mounting plate 60 configured to support a blade cuff 52 and a corresponding electrical actuator 56 in this parallel orientation (see FIG. 2). For example, a blade cuff 52 and an electrical actuator 56 may be mounted to and extend outwardly from a first surface 62 of the mounting plate 60, and the second, opposite surface 64 of the mounting plate 60 may couple to a portion of the rotor hub 22. Alternatively, the rotor hub 22 may be shaped to include integral mounts to accommodate both the blade cuffs 52 and the actuators 56.

Figure 3A:
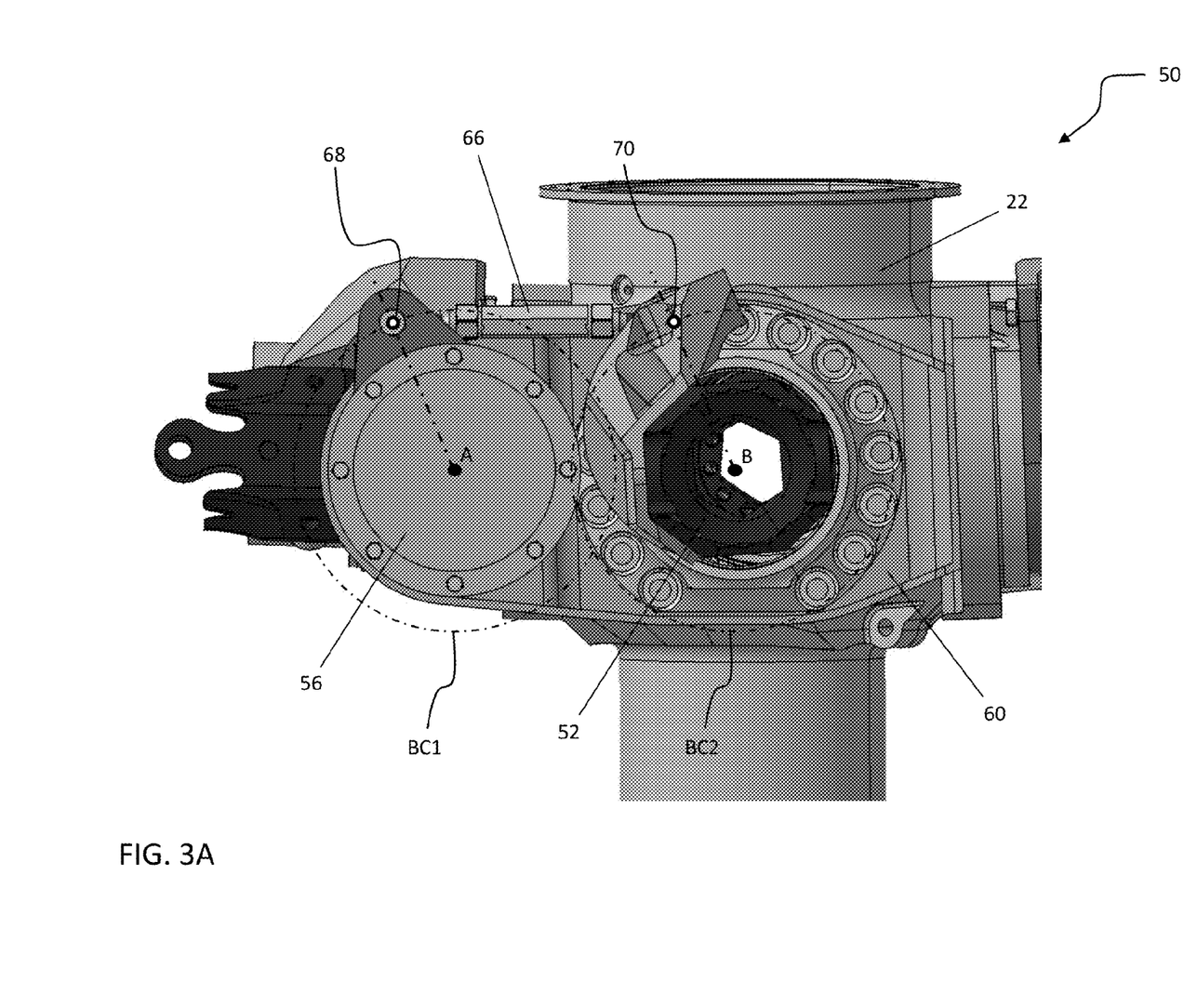
FIG. 3A is a side view of an IBCS according to an embodiment of the present invention.

Each electrical actuator 56 is directly or indirectly coupled to an adjacent blade cuff 52 such that rotation of the electrical actuator 56 causes a proportional rotation of the blade cuff 52. In one embodiment, a connector 66, such as a push rod for example, extends between an actuator 56 and an adjacent blade cuff 52. A first end of the connector 66 may be coupled to the actuator 56 at pivot joint 68 and a second end of the connector 66 may be coupled to the blade cuff 52 at pivot joint 70 (see FIG. 3A). Pivot joint 68 travels along base circle BC1 and pivot joint 70 travels along base circle BC2. When the actuator 56 rotates in a first direction, the mechanical coupling, provided by pivot joint 68, connector 66 and pivot joint 70, causes a rotation of the coupled blade cuff 52 in the first direction. In one embodiment, as illustrated in FIG. 3A, base circle BC1 and base circle BC2 have a similar diameter causing a direct 1:1 rotation of blade cuff 52 relative to actuator 56. Alternately, base circle BC1 and base circle BC2 may have different diameters causing an indirect rotation of blade cuff 52 relative to actuator 56.

In another embodiment, illustrated in FIG. 4, rotational motion of the actuator 56 is transferred to the blade cuff 52 via a plurality of gears. By coupling each actuator 56 and blade cuff 52 with a plurality of meshed gears, the actuator 56 is configured to rotate the blade cuff 52 about axis B. For example, a first gear 72 may be coupled to the electrical actuator 56 and a second gear 74 may be mounted to the blade cuff 52 such that the first gear 72 and the second gear 74 are arranged in a meshing engagement. The first gear 72 and second gear 74 may be similar in size or alternately, the first gear 72 and the second gear 74 may be different sizes to provide a desired speed ratio. The plurality of gears may alternatively include additional gears arranged between the first gear 72 and the second gear 74 for example to form a gear train.

Figure 5:
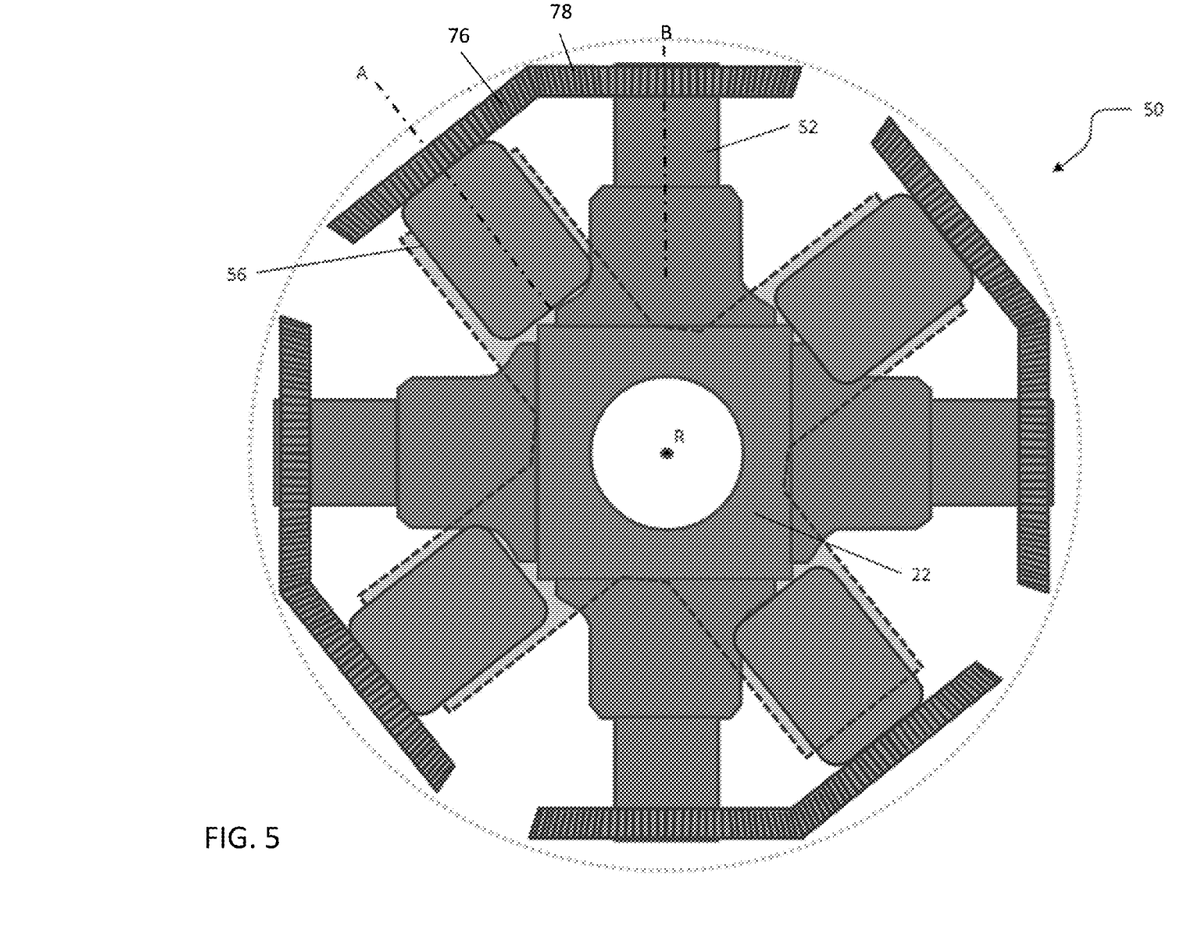
FIG. 5 is a top view of an IBCS according to another embodiment of the present invention.
Figure 6:
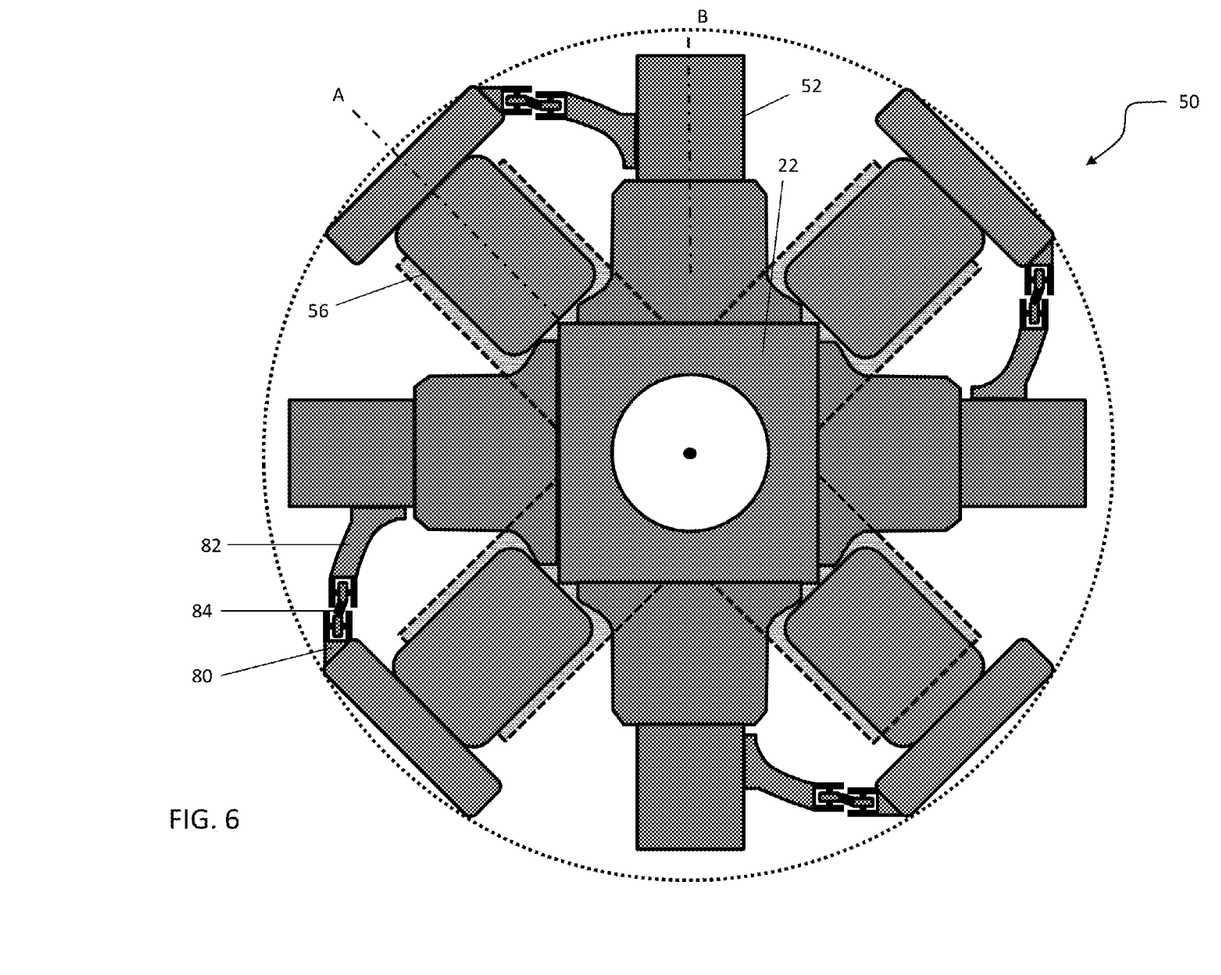
FIG. 6 is a side view of a portion of an IBCS according to an embodiment of the invention.
Figure 7:
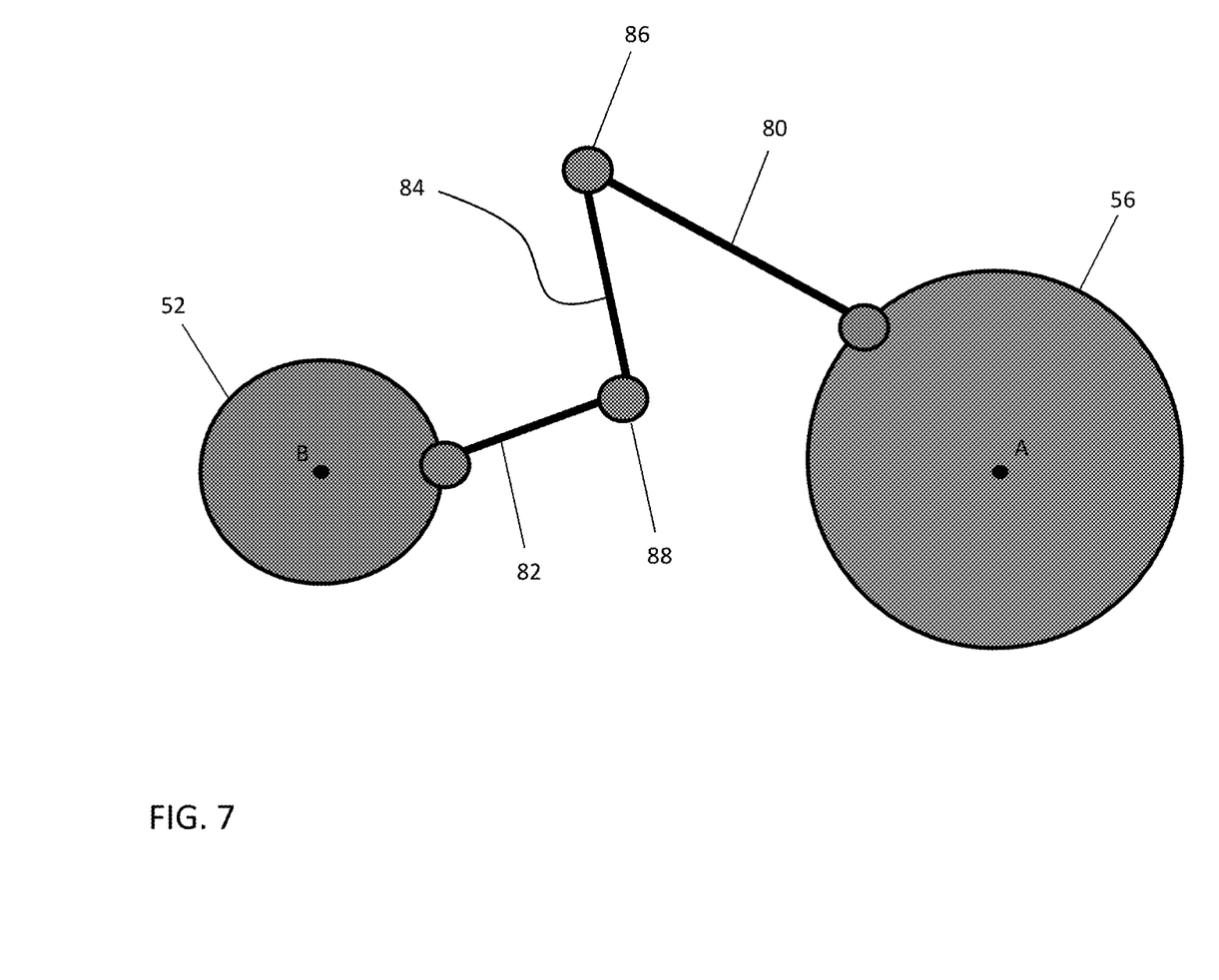
FIG. 7 is a top view of an IBCS according to another embodiment of the present invention.

Referring now to FIGS. 5-7, another configuration of an IBCS 50 for use with a rotor system is illustrated. In the illustrated embodiment, the electrical actuators 56 are mounted to the rotor hub 22 azimuthally between adjacent blade cuffs 52 such that the rotational axis A of each actuator 56 is arranged at an angle to the rotational axes B of the adjacent blade cuff 52. In one embodiment, a plurality of bevel gears may be used to couple each blade cuff 52 to an azimuthally oriented actuator 56 (see FIG. 5). For example, a first gear 76 may be coupled to the electrical actuator 56 and a second gear 78 may be mounted to the blade cuff 52 such that the first gear 76 and the second gear 78 are arranged in a meshing engagement. The first gear 76 and second gear 78 may be similar in size or alternately, the first gear 76 and the second gear 78 may be different sizes to provide a desired speed ratio. The plurality of gears may alternatively include additional gears arranged between the first gear 76 and the second gear 78 for example to form a gear train.

In another embodiment, a plurality of connectors may be used to couple each actuator 56 to one of the adjacent blade cuffs 52 (FIGS. 6 and 7). For example, a first connector 80 extends from an electrical actuator 56 towards the blade cuff 52, a second connector 82 extends from the blade cuff 52 towards the actuator 56, and a third connector 84 couples the first and second connectors 80, 82 at pivot joints 86, 88.

Figure 8:
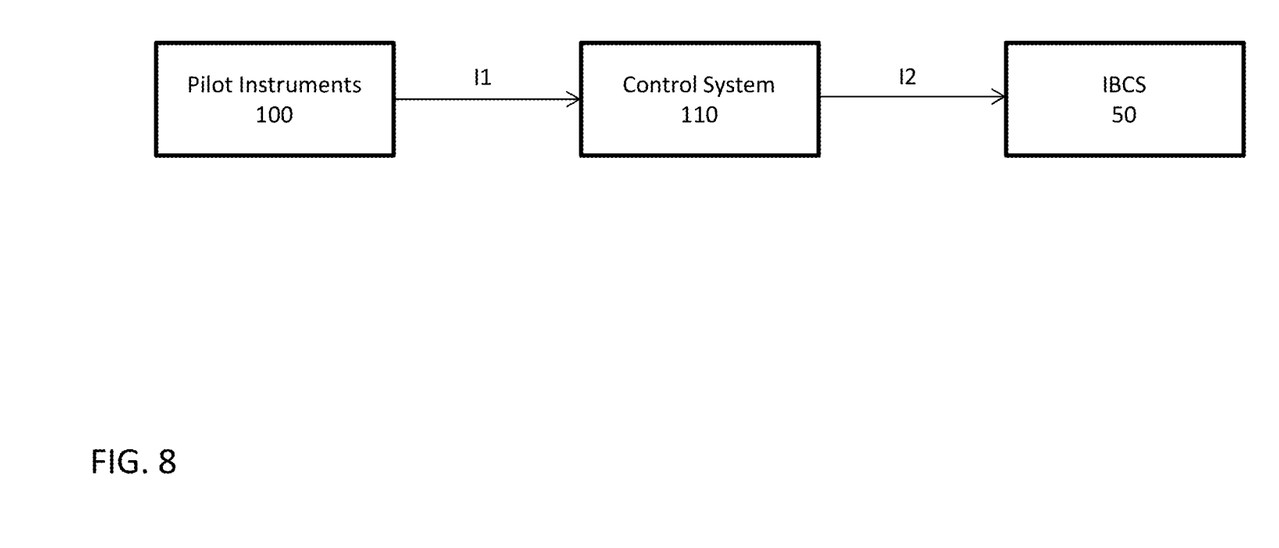
FIG. 8 is a schematic illustration of a control system for adjusting the pitch of at least one rotor blade according to an embodiment of the invention.

FIG. 8 is a schematic illustration of a control system 110 for adjusting the pitch of at least one rotor blade according to an embodiment of the invention. When the pilot of a rotary wing aircraft 10 applies a force to at least one of a plurality of instruments 100 for controlling the trajectory of the rotary wing aircraft 10, an input signal I1 is provided to a control system 110, such as through fly-by-wire communication for example. In response to receiving the input signal I1 from the pilot's instruments 100, the control system 110 sends a signal I2 to the electrical actuators 56 of the IBCS 50 commanding the electrical actuators 56 to rotate a given amount in either a first direction or a second direction to achieve a desired pitch of the rotor blades 20. The signal I2 provided by the control system 110 may instruct all of the electrical actuators 56 to rotate, or alternatively may instruct only a portion of the plurality of electrical actuators 56 to rotate.

The IBCS 50 is compatible with a plurality of rotor hub styles. In addition, the IBCS 50 eliminates the need for a swashplate and therefore reduces the height of the rotor system. Placement of the actuators 56 within the rotor plane minimizes drag and allows the IBCS 50 to be encased in a fairing for further drag reduction. The centrifugal force generated by each actuator 56 is cancelled by an oppositely mounted actuator 56. In addition, by externally mounting the actuators 56 to the rotor hub, the actuators 56 are more accessible for maintenance and inspection and also more efficiently dissipate heat from the rotor system.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An individual blade control system (IBCS) for a rotor system having a rotor hub comprising:
a plurality of blade cuffs mounted to the rotor hub, each blade cuff being configured to receive a rotor blade and rotate about a blade axis;
a plurality of electrical actuators mounted to the rotor hub diametrically opposite one another and adjacent at least one of the plurality of blade cuffs, each electrical actuator being configured to rotate about an actuator axis, the plurality of blade axes and the plurality of actuator axes being arranged in a plane; wherein each electrical actuator is coupled to an adjacent blade cuff such that rotation of one of the plurality of electrical actuator causes a proportional rotation of only the blade cuff coupled to that electrical actuator.

2. The IBCS according to claim 1, wherein a connector extends between each of the plurality of electrical actuators and a coupled blade cuff.

3. The IBCS according to claim 2, wherein the connector is a push rod.

4. The IBCS according to claim 1, wherein a plurality of gears extend between each of the plurality of electrical actuators and a coupled blade cuff.

5. The IBCS according to claim 4, wherein a first gear is mounted to each of the plurality of electrical actuators and a second gear is connected to each of the plurality of blade cuffs, and the first gear and the second gear of a coupled electrical actuator and blade cuff are arranged in a meshing engagement.

6. The IBCS according to claim 5, wherein the first gear and the second gear are substantially identical.

7. The IBCS according to claim 5, wherein the first gear and the second gear are substantially different sizes to achieve a desired gear ratio.

8. The IBCS according to claim 1, wherein the actuator axis of each of the plurality of electrical actuators is arranged at an angle to the blade axis of the blade cuff coupled thereto.

9. The IBCS according to claim 8, wherein each of the plurality of electrical actuators is positioned azimuthally between adjacent blade cuffs.

10. The IBCS according to claim 9, wherein each of the plurality of electrical actuators is coupled to an adjacent blade cuff with a plurality of connectors.

11. The IBCS according to claim 8, wherein a plurality of angled bevel gears extend between each of the plurality of electrical actuators and a coupled blade cuff.

12. The IBCS according to claim 11, wherein a first gear is mounted to each of the plurality of electrical actuators and a second gear is connected to each of the plurality of blade cuffs, and the first gear and the second gear of a coupled electrical actuator and blade cuff are arranged in a meshing engagement.

13. The IBCS according to claim 12, wherein the first gear and the second gear are substantially identical.

14. The IBCS according to claim 12, wherein the first gear and the second gear are substantially different sizes to achieve a desired gear ratio.

15. A rotary wing aircraft comprising:
a rotor system having at least one rotatable rotor hub;
a plurality of blade cuffs mounted to the at least one rotor hub, each blade cuff being configured to receive a rotor blade and rotate about a blade axis;
a plurality of electrical actuators mounted to the at least one rotor hub diametrically opposite one another and adjacent at least one of the plurality of blade cuffs, each electrical actuator being configured to rotate about an actuator axis, the plurality of blade axes and the plurality of actuator axes being arranged in a plane; wherein each electrical actuator is coupled to an adjacent blade cuff such that rotation of one of the plurality of electrical actuator causes a proportional rotation of only the blade cuff coupled to that electrical actuator.

16. The rotary wing aircraft according to claim 15, wherein a connector extends between each of the plurality of electrical actuators and a coupled blade cuff.

17. The rotary wing aircraft according to claim 15, wherein a plurality of gears extend between each of the plurality of electrical actuators and a coupled blade cuff.

18. The rotary wing aircraft according to claim 15, wherein the actuator axis of each of the plurality of electrical actuators is arranged at an angle to the blade axis of the blade cuff coupled thereto.

19. The rotary wing aircraft according to claim 18, wherein each of the plurality of electrical actuators is positioned azimuthally between adjacent blade cuffs.

20. The rotary wing aircraft according to claim 19, wherein each of the plurality of electrical actuators is coupled to an adjacent blade cuff with a plurality of connectors.

21. The rotary wing aircraft according to claim 15, further comprising at least one pilot control operably coupled to a control system, wherein the control system is configured to command at least one of the electrical actuators to rotate upon receipt of a signal from the at least one pilot control.

22. The rotary wing aircraft according to claim 21, wherein the control system commands the plurality of electrical actuators to rotate upon receipt of the signal from the at least one pilot control.

* * * * *